Patented Dec. 3, 1929

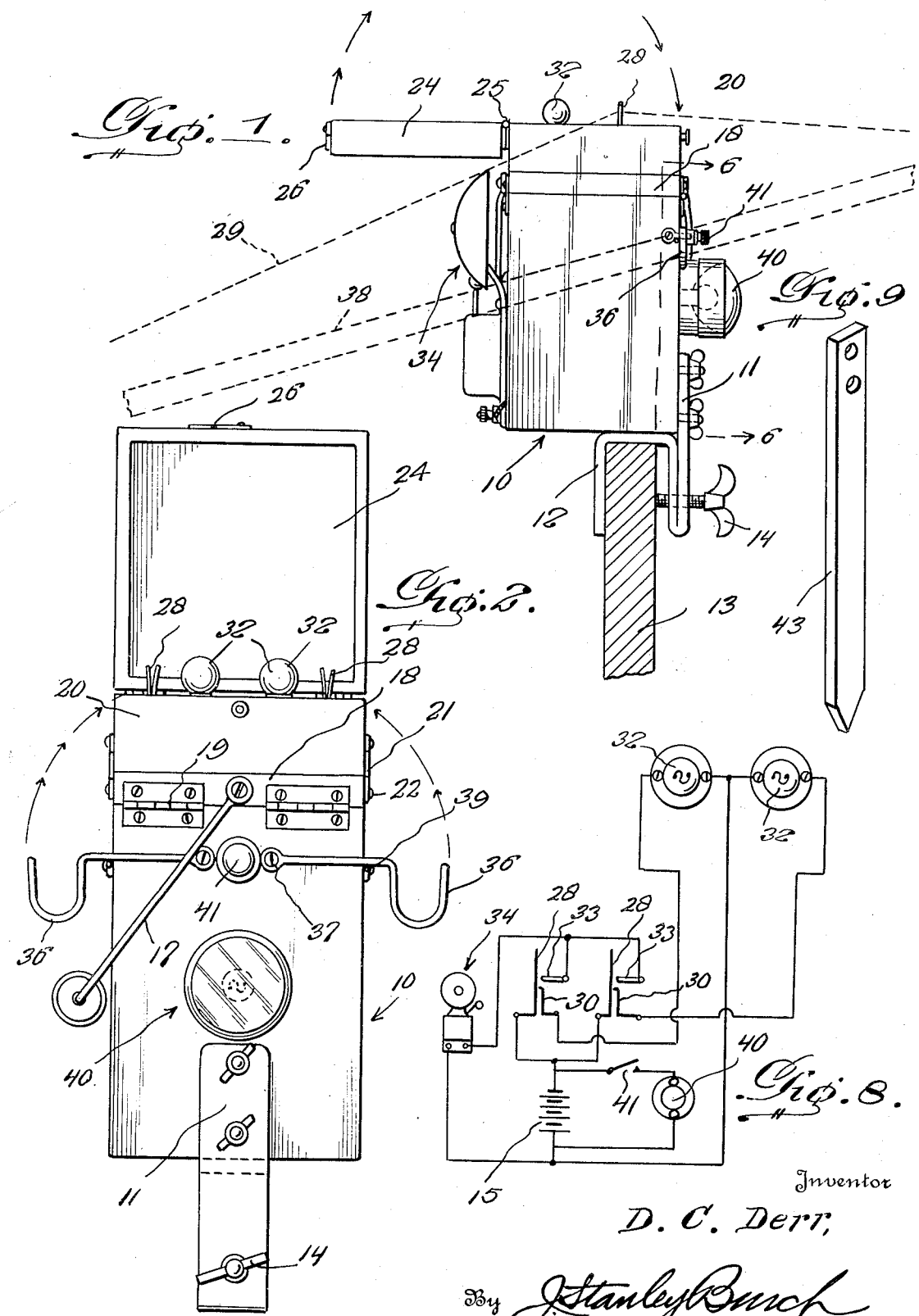

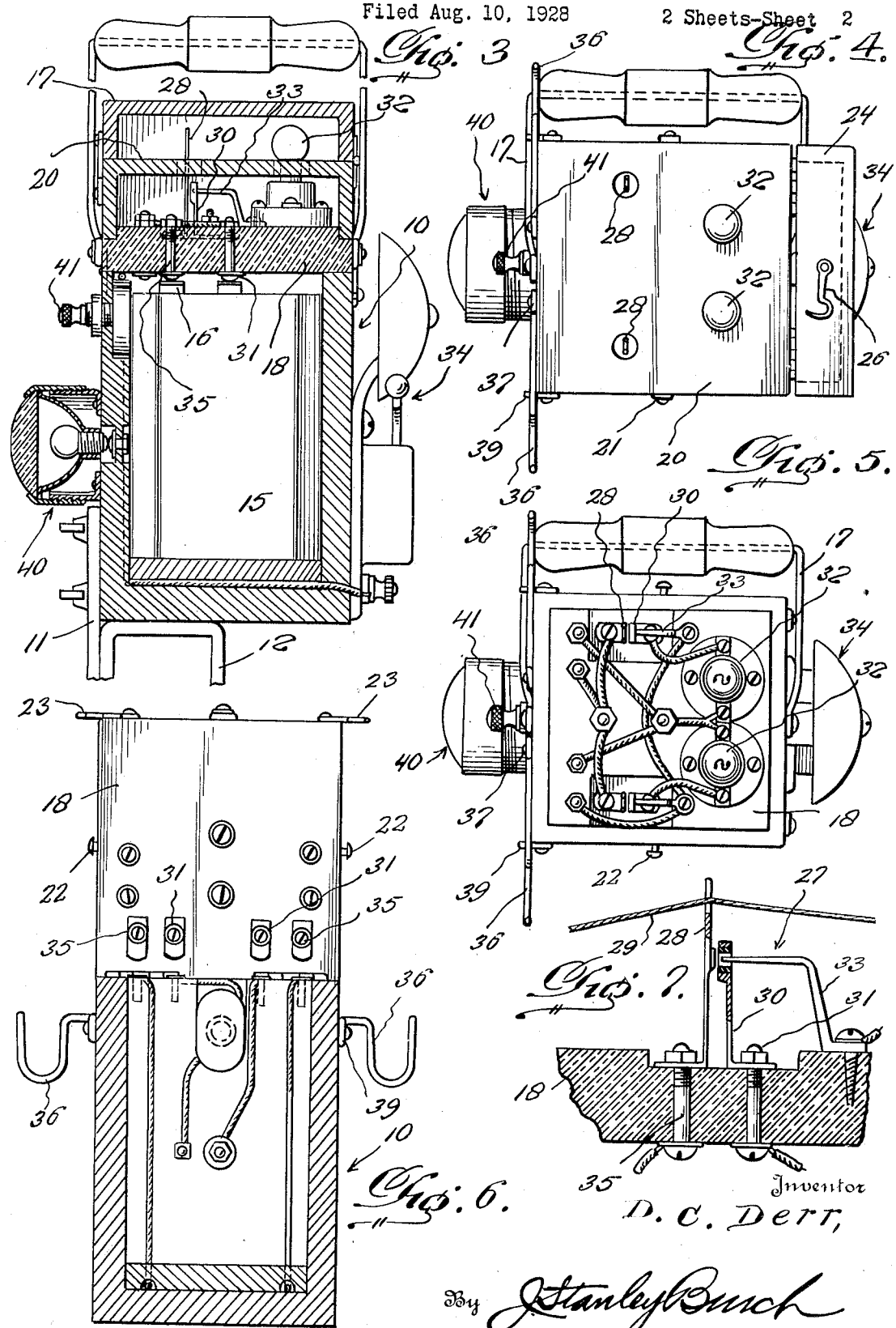

1,737,921

UNITED STATES PATENT OFFICE

DAVID C. DERR, OF SHAMOKIN, PENNSYLVANIA

FISHING-LINE SIGNAL

Application filed August 10, 1928. Serial No. 298,776.

This invention relates to an improved fishing line signal, that is, a relatively small portable self-contained structure embodying audible and visible electrical signalling means serving to conveniently and properly notify the attendant or fisherman when there is a nibble and when the hook has been struck.

More specifically stated, the invention has reference to a structure of this class which is characterized by a battery container in the form of a casing equipped with means for appropriate anchorage and support, provided with successively operable visible and audible signalling elements, and sequential electrical relays embodying fishing line grips constructed to be actuated by a pull on the line, whereby to afford a visible signal when there is a nibble and an audible signal when the hook has been struck or taken.

My principal aim is to provide a structure of this class which is economical, practicable, easily carried, easily placed in position for use, one which is postive and dependable in action, efficient in performance, and otherwise capable of fulfilling the requirements of an invention of this type in a desirable manner.

Other features and advantages of construction such as compactness and convenience of arrangement of parts, simplicity and durability will become more rapidly apparent from the following description and drawings.

In the drawings:

Figure 1 is an elevational view of a signal device constructed in accordance with the present invention showing the same clamped upon the side wall of a boat.

Figure 2 is an inside elevational view looking in a direction from right to left in Figure 1.

Figure 3 is a vertical sectional view through the structure.

Figure 4 is a top plan view of Figure 1 on a slightly enlarged scale with the structure turned through approximately 180°.

Figure 5 is a view similar to Figure 4 with the removable parts of the cover taken off to expose certain of the details.

Figure 6 is a view taken approximately upon the plane of the line 6—6 of Figure 1 with the hinged parts of the closure swung to open position.

Figure 7 is an enlarged fragmentary view showing one of the electrical relays or circuit make and break devices.

Figure 8 is a wiring diagram.

Figure 9 is a perspective view of an anchoring stake.

In carrying out the invention I provide a container in the form of a box-like casing 10. This is here shown as of rectangular configuration and is open at its top to accommodate an especially constructed closure. Fastened to one side near the bottom and removably held in place is an arm 11 (see Figure 1) carrying a U-shaped clamp or hook 12 to take over the side wall 13 of the boat. Here we find a thumb bolt 14 for holding the clamp in place and consequently holding the complete device on the wall of the boat. Inside of this container is a battery 15 (see Figure 3) in the form of an ordinary dry cell provided with spring contacts 16. I also call attention to a handle equipped carrying bail 17 attached to the container to permit it to be conveniently carried from place to place.

The closure comprises a mounting base 18 of insulation material hingedly connected to the box-like container as at 19 in Figure 2. This is constructed to accommodate the visible signalling means as well as the electrical relays and cooperating elements. Furthermore, it embodies a raised central portion as shown in Figure 3 to accommodate the lower section 20 of the removable cover. This section is simply in the form of a hood which fits down onto the base as shown in this figure and which is provided with openings to accommodate protruding parts. Incidentally, it is equipped with hooks 21 to engage headed keepers 22 on the central portions of the base block 18. This block itself is provided with hooks 23 to fasten it down in place as indicated in Figure 3. The upper section 24 of the removable cover parts is hinged at 25 to the lower section and is provided with retaining hooks 26. Thus, I provide a two-part closure including a hinged mounting base and a sectional cover for concealing and protecting complemental parts of the structure.

Attention is now invited to Figure 7 wherein it will be observed that I have shown one of the electrical sequential relay devices indicated generally by the reference character 27. In this connection I would say that in the actual structure there are two of these devices but the description of one will suffice for both. Each relay includes an upstanding resilient grip 28 whose upper end is forked to accommodate the fishing line 29. The fishing line is simply drawn between the portions of the fork as here shown and also as shown in dotted lines in Figure 1, and it is wedged down tightly so that a pull on the line in an outward direction will actuate the grip. Normally however this grip occupies an inoperative spaced position along side of a relatively stationary contact element 30, this element being fastened to a binding post 31 included in a primary electric circuit for actuating one of the electric bulbs 32. This contact element 30 is constructed at its top with an eye into which a horizontal finger of a second contact 33 projects, this contact being cooperable with a button-like projection on the grip 28. The contact 33 is included in a secondary circuit for operating the audible signal which is here shown in the form of a bell 34. Thus, I provide an electrical relay of the sequential or successive nature for controlling the primary light circuit and audible secondary signal circuit in an intermittent manner or order. It is to be noted that there are a pair of visible light signals in a single audible bell signal, the lights being mounted in sockets which are in turn fastened to the insulated base 18. As before stated the lower section of the removable part of the cover is apertured to permit projection of the protruding grips 28 and electric bulbs 32. It is to be further noted that the binding post 31 cooperates with a similar binding post 35 to complete the circuit of the current being conducted through these posts when they are engaged with the spring contacts 16 on the battery 15. Incidentally this battery may be an ordinary dry cell.

I next wish to invite attention to a pair of hooks 36 pivoted at 37 on the inner face of the battery casing as shown in Figure 2. These serve to support the fishing rod 38 and they are normally in horizontal rod-supporting position where they are held on suitable rests 39 on the casing. They can however be swung to an out-of-the-way position in the direction of the arrows as shown in this figure.

The rod supporting hooks are located on opposite sides of a spot light 40 which is wired to the battery in any suitable manner and which is controlled by an appropriate switch 41 as detailed in Figure 3. This light is for the purpose of facilitating baiting or removing the catch from the line, at night.

In practice it is obvious that the fishing rod line 29 is wedged into the forked upper end of the grip 28 and the rod 38 is rested in the hook 36 after fastening the device on the boat or other stationary support. Obviously then, a light pull on the line will close the primary visible signal circuit to attract the attention of the attendant. If however the hook is taken or struck the primary circuit will be closed first and the secondary circuit successively closed to ring the bell to facilitate landing the catch.

I have shown the method of wiring in Figure 8 wherein I have employed like reference characters to designate like parts already described and by referring to this figure it will be easy to trace the circuit. Also in Figure 9 I have shown a stake 43 which may replace the clamp 12 when it is desired to anchor the device on shore. Since the arrangement of wires may be varied, it is thought unnecessary to describe these features in detail. In fact it is thought that by considering the preceding description in association with the drawings a clear understanding of the construction, operation and advantages of the invention will be had. Consequently a more lengthy description is regarded unnecessary.

Minor changes in shape, size, and rearrangement of parts coming within the field of the invention claimed may be resorted to in actual practice, if desired.

I claim:

1. A fishing line signalling device comprising a support, an audible signal on the support, a visible signal on said support, and a sequential electrical relay on the support cooperable with said signal means and including a line actuated element.

2. A fishing line signalling device comprising a support, a primary visible signal thereon, a secondary audible signal on said support, and an electrical relay embodying a relatively movable line-actuated grip and complemental relatively stationary successively operable contact elements associated with said grip, whereby to operate said signals in order.

3. A fishing line signal comprising a portable battery container, attaching and anchoring means therefor, a removable battery in the container, a carrying bail for the container, successively operable visible and audible signal elements on the container, and a sequential fishing line actuated relay on the container operatively associated with the battery and said signal elements.

4. A fishing line signal comprising a portable battery container, attaching and anchoring means therefor, a removable battery in the container, a carrying bail for the container, successively operable visible and audible signal elements on the container, and a sequential fishing line actuated relay on the container operatively associated with the battery and said signal elements, together with a spot light in electrical connection with the battery, and an individual manually manipulated switch for the spot light.

5. In a fishing line signal device of the class described, an insulated base and an electrical relay mounted thereon, said relay embodying a resilient forked grip for the reception of a fishing line, a relatively stationary primary contact cooperable with said grip, and a relatively stationary second contact also cooperable with the grip.

6. In a fishing line signal device of the class described, an insulated base and an electrical relay mounted thereon, said relay embodying a resilient forked grip for the reception of a fishing line, a relatively stationary primary contact cooperable with said grip, and a relatively stationary second contact also cooperable with the grip, said primary contact having an eye at its upper end, and said secondary contact embodying a finger extending into said eye for cooperation with said grip.

7. In a fishing line signalling device of the class described, an open top battery container, attaching means for the container, a signalling bell on said container, a spot light on the container, a battery in said container, a hinged closure for the open top of the container, said closure embodying an insulated base, a pair of signal lights on said base, a pair of complemental electrical relays on the base including line-actuated grips, and a carrying bail.

8. In a fishing line signalling device of the class described, an open top battery container, attaching means for the container, a signalling bell on said container, a spot light on the container, a battery in said container, a hinged closure for the open top of the container, said closure embodying an insulated base, a pair of signal lights on said base, a pair of complemental electrical relays on the base including line-actuated grips, and a carrying bail, together with a pair of individual rod supporting hooks on said container.

9. In a fishing line signalling device, a portable battery container, attaching means for the container, primary visible signalling elements on the container, a secondary audible signalling element on the container, a pair of electrical relays including line-actuated elements, a carrying bail, and a pair of pivotally mounted fishing rod supporting members on said container.

In testimony whereof I affix my signature.

DAVID C. DERR.